United States Patent
Cullinan et al.

(10) Patent No.: US 10,712,364 B2
(45) Date of Patent: Jul. 14, 2020

(54) METROLOGY DEVICES FOR RAPID SPECIMEN SETUP

(71) Applicant: BOARD OF REGENTS, THE UNIVERSITY OF TEXAS SYSTEM, Austin, TX (US)

(72) Inventors: Michael Cullinan, Austin, TX (US); Tsung-Fu Yao, Austin, TX (US); Andrew Duenner, Houston, TX (US)

(73) Assignee: Board of Regents, The University of Texas Systems, Austin, TX (US)

( * ) Notice: Subject to any disclaimer, the term of this patent is extended or adjusted under 35 U.S.C. 154(b) by 0 days.

(21) Appl. No.: 15/773,327

(22) PCT Filed: Nov. 3, 2016

(86) PCT No.: PCT/US2016/060233
§ 371 (c)(1),
(2) Date: May 3, 2018

(87) PCT Pub. No.: WO2017/079374
PCT Pub. Date: May 11, 2017

(65) Prior Publication Data
US 2018/0321277 A1    Nov. 8, 2018

Related U.S. Application Data

(60) Provisional application No. 62/250,214, filed on Nov. 3, 2015.

(51) Int. Cl.
*G01Q 10/00* (2010.01)
*G01Q 30/00* (2010.01)
(Continued)

(52) U.S. Cl.
CPC ............. *G01Q 30/00* (2013.01); *G01Q 10/04* (2013.01); *G12B 5/00* (2013.01); *G01Q 60/24* (2013.01)

(58) Field of Classification Search
CPC ........ G01Q 10/02; G01Q 10/04; G01Q 10/06; G01Q 30/00; G01Q 60/24; B82Y 35/00; G12B 5/00
See application file for complete search history.

(56) References Cited

U.S. PATENT DOCUMENTS 4,390,172 A * 6/1983 Gotman ............... B23Q 1/5462
198/345.3
4,785,177 A * 11/1988 Besocke ................ B82Y 35/00
250/442.11
(Continued)

FOREIGN PATENT DOCUMENTS

EP         1995737        11/2008

OTHER PUBLICATIONS

Watral, Adrienne. Design and engineering of low-cost centimeter-scale repeatable and accurate kinematic fixtures for nanomanufacturing equipment using magnetic preload and potting. Diss. Massachusetts Institute of Technology, 2011 (Year: 2011).*
(Continued)

*Primary Examiner* — Wyatt A Stoffa
(74) *Attorney, Agent, or Firm* — Meunier Carlin & Curfman LLC

(57) ABSTRACT

An example metrology device can include a first stage including a microelectromechanical (MEMS) device having a probe, and a second stage configured to hold a sample. The metrology device can also include a kinematic coupler for constraining the first stage in a fixed position relative to the second stage. The probe of the MEMS device can be aligned with a portion of the sample when the first stage is constrained in the fixed position relative to the second stage.

21 Claims, 13 Drawing Sheets

(51) Int. Cl.
*G12B 5/00* (2006.01)
*G01Q 10/04* (2010.01)
*G01Q 60/24* (2010.01)

(56) References Cited

U.S. PATENT DOCUMENTS

| | | | |
|---|---|---|---|
| 5,015,850 A | 5/1991 | Zdeblick et al. | |
| 5,255,258 A | 10/1993 | Kawade et al. | |
| 5,286,977 A | 2/1994 | Yokoyama et al. | |
| 5,345,690 A * | 9/1994 | McMurtry | G01B 5/012 33/558 |
| 5,376,790 A * | 12/1994 | Linker | G01Q 10/04 250/307 |
| 5,450,746 A * | 9/1995 | Howard | B82Y 35/00 73/105 |
| 5,496,999 A * | 3/1996 | Linker | G01Q 10/04 250/307 |
| 5,621,211 A * | 4/1997 | Spence | B82Y 35/00 250/287 |
| RE35,514 E * | 5/1997 | Albrecht | G01Q 40/00 250/216 |
| 5,656,769 A | 8/1997 | Nakano et al. | |
| 5,666,190 A | 9/1997 | Quate et al. | |
| 5,678,944 A * | 10/1997 | Slocum | F16F 15/04 403/13 |
| 5,748,827 A * | 5/1998 | Holl | H01L 21/68 385/134 |
| 5,750,989 A * | 5/1998 | Lindsay | B82Y 35/00 250/442.11 |
| 5,757,561 A * | 5/1998 | Sechrist | C08J 5/18 359/818 |
| 5,760,396 A * | 6/1998 | Lindsay | B82Y 10/00 250/440.11 |
| 5,801,472 A | 9/1998 | Wada et al. | |
| 5,847,387 A * | 12/1998 | Shedd | B82Y 35/00 850/60 |
| 5,986,262 A | 11/1999 | Volker | |
| 6,201,227 B1 | 3/2001 | Tomita | |
| 6,229,607 B1 * | 5/2001 | Shirai | B82Y 35/00 356/614 |
| 6,583,411 B1 | 6/2003 | Altmann et al. | |
| 6,688,183 B2 | 2/2004 | Awtar et al. | |
| 6,708,556 B1 | 3/2004 | Kim et al. | |
| 6,746,172 B2 * | 6/2004 | Culpepper | F16M 7/00 403/13 |
| 6,806,991 B1 | 10/2004 | Sarkar et al. | |
| 7,239,107 B1 * | 7/2007 | Ferreira | H02N 1/006 318/569 |
| 7,775,088 B2 | 8/2010 | Ruby | |
| 8,079,093 B2 | 12/2011 | Fouchier | |
| 8,169,750 B1 | 5/2012 | Guzik et al. | |
| 8,390,233 B2 * | 3/2013 | Shilpiekandula | B82Y 10/00 318/135 |
| 8,782,810 B2 * | 7/2014 | Masser | G01Q 10/04 850/1 |
| 9,476,908 B2 * | 10/2016 | Van Den Braber | G01Q 70/06 |
| 9,528,824 B2 * | 12/2016 | Bos | G01B 21/04 |
| 2002/0190604 A1 * | 12/2002 | Shibaike | B82Y 35/00 310/309 |
| 2003/0033863 A1 * | 2/2003 | Ashby | G01Q 10/06 73/105 |
| 2003/0086748 A1 * | 5/2003 | Culpepper | F16M 7/00 403/13 |
| 2004/0025578 A1 | 2/2004 | Hare et al. | |
| 2005/0205776 A1 | 9/2005 | Dana et al. | |
| 2005/0269035 A1 | 12/2005 | Kawakami et al. | |
| 2006/0138871 A1 | 6/2006 | Rakhovsky | |
| 2006/0187803 A1 | 8/2006 | Baechtold et al. | |
| 2007/0084273 A1 | 4/2007 | Hare et al. | |
| 2007/0089496 A1 | 4/2007 | Degertekin | |
| 2007/0180889 A1 | 8/2007 | Murayama et al. | |
| 2008/0149832 A1 * | 6/2008 | Zorn | B82Y 35/00 250/311 |
| 2008/0223122 A1 | 9/2008 | Watanbe et al. | |
| 2008/0225677 A1 | 9/2008 | Cherubini et al. | |
| 2008/0229812 A1 * | 9/2008 | Hund | G01Q 30/20 73/105 |
| 2008/0253269 A1 | 10/2008 | Koga et al. | |
| 2010/0001616 A1 * | 1/2010 | Ferreira | H02N 1/008 310/300 |
| 2010/0116161 A1 | 5/2010 | Shilpiekandula | |
| 2010/0170015 A1 * | 7/2010 | Park | B82Y 35/00 850/1 |
| 2010/0275717 A1 * | 11/2010 | Poyet | B82Y 35/00 74/479.01 |
| 2011/0047661 A1 | 2/2011 | Leach et al. | |
| 2011/0154645 A1 | 6/2011 | Morgan | |
| 2012/0168593 A1 | 7/2012 | Mekid et al. | |
| 2012/0324608 A1 * | 12/2012 | Rychen | B82Y 35/00 850/53 |
| 2013/0333077 A1 * | 12/2013 | Murdick | G01Q 30/025 850/9 |
| 2014/0133897 A1 * | 5/2014 | O Ceallaigh | B23P 19/10 403/53 |
| 2014/0223612 A1 * | 8/2014 | Proksch | B82Y 35/00 850/1 |
| 2014/0289911 A1 * | 9/2014 | Humphris | G01Q 30/06 850/5 |
| 2015/0185248 A1 | 7/2015 | Sadeghian et al. | |
| 2016/0245843 A1 | 8/2016 | Shioda et al. | |
| 2017/0131323 A1 * | 5/2017 | Sadeghian Marnani | G01Q 10/04 |
| 2018/0321276 A1 * | 11/2018 | Cullinan | G01Q 10/04 |

OTHER PUBLICATIONS

Bal-Tec, The Kinematic Encyclopedia, retrieved https://web.archive.org/web/20140819202400/https://www.precisionballs.com/KINEMATIC_ENCYCLOPEDIA.php (Year: 2014).*

Morse, J.D. "Nanofabrication Technologies for Roll-to-Roll Processing", Report from the NIST-NNN Workshop Sep. 27-28, 2011, Boston, MA, 32 pages.

Sarkar, N. et al. "CMOS-MEMS Dynamic FM Atomic Force Microscope", Transducers 2013, Barcelona, Spain, Jun. 16-20, 2003.

Sarkar, N. et al. "Single-Chip Atomic Force Microscope With Integrated Q-Enhancement and Isothermal Scanning" MEMS 2014, San Francisco, CA, USA, Jan. 26-30, 2014.

Schitter, G. et al. "Design and input-shaping control of a novel scanner for high-speed atomic force microscopy" Mechatronics 18 (2008) 282-288.

Aphale, S.S. et al. "Minimizing Scanning Errors in Piezoelectric Stack-Actuated Nanopositioning Platforms", IEEE Transactions on Nanotechnology, vol. 7, No. 1, Jan. 2008, 79-90.

Awtar, S. et al. "Design of a Large Range XY Nanopositioning System", Journal of Mechanisms and Robotics 2013; 5(2):021008.

Xu, Q. "Design and Testing of a Novel XY Micropositioning Stage with Dual Ranges and Resolutions", IEEE International Conference on Robotics & Automation 2014, Hong Kong, China, May 31-Jun. 7.

Patil, R. et al. "FEA Analysis and Experimental Investigation of Building Blocks for Flexural Mechanism", ICNTE-2015, Jan. 9-10.

International Search Report and Written Opinion dated Mar. 17, 2017, from International Application No. PCT/US2016/060234, 11 pages.

International Search Report and Written Opinion dated Feb. 9, 2017, from International Application No. PCT/US2016/060233, 7 pages.

* cited by examiner

| REPEATABILITY | X(μm) | Y(μm) | Z(μm) |
|---|---|---|---|
| St. D. | 0.390 | 0.361 | 0.060 |

METROLOGY DEVICES FOR RAPID SPECIMEN SETUP

CROSS-REFERENCE TO RELATED APPLICATIONS

This application is a 371 of International Application Number PCT/US2016/060233 filed Nov. 3, 2016, which claims the benefit of U.S. Provisional Patent Application No. 62/250,214, filed on Nov. 3, 2015, entitled "METROLOGY DEVICES FOR RAPID SPECIMEN SETUP," the disclosures of which are expressly incorporated herein by reference in their entirety.

STATEMENT REGARDING FEDERALLY FUNDED RESEARCH

This invention was made with government support under Grant no. EEC1160494 awarded by the National Science Foundation. The government has certain rights in the invention.

BACKGROUND

In the nano-fabrication industry, metrology is an important issue because it is needed to ensure the correct alignment and patterning of features. Integrating a sensing system which can instantaneously send back the dimensional information about manufactured products can reduce losses and defect rates. However, it is difficult to perform in-line metrology in nano-fabrication systems because it requires not only real-time inspection but also nanoscale resolution of complex features.

Atomic force microscopy (AFM) has high resolution ability (e.g., sub-nm-scale) and is widely utilized in scientific and industrial applications. However, there are two main drawbacks to the use of AFM metrology in in-line manufacturing applications. The first is the low scanning speed of the AFM sensing probe. The second is the time it takes to place and align samples in the AFM (i.e., long set up times). For example, optical systems and technologies are typically used to align samples by determining the location of the AFM sensing probe relative to the sample. As a result, displacements of the AFM sensing probe are limited to on the order of $\mu m$ to achieve sub-$\mu m$ precision.

SUMMARY

An example metrology device can include a first stage including a microelectromechanical (MEMS) device having a probe, and a second stage configured to hold a sample or specimen. The metrology device can also include a kinematic coupler for constraining the first stage in a fixed position relative to the second stage. The probe of the MEMS device can be aligned with a portion of the sample when the first stage is constrained in the fixed position relative to the second stage.

Additionally, the kinematic coupler can optionally be configured to constrain the first stage in six degrees of freedom. Alternatively or additionally, the kinematic coupler can optionally include a plurality of fasteners coupled to the first stage and a plurality of grooves arranged on the second stage. In some implementations, each of the fasteners can be configured to interface with one of the grooves to constrain the first stage in the fixed position relative to the second stage. For example, each of the fasteners can optionally be a ball configured to interface with one of the grooves to constrain the first stage in the fixed position relative to the second stage. Alternatively or additionally, each of the grooves can optionally be a vee-block.

Alternatively or additionally, the metrology device can optionally include a plurality of micrometers. Each of the micrometers can be further configured to adjust the fixed position of the first stage relative to the second stage. In some implementations, the fasteners can be attached to and/or extend from the micrometers.

Alternatively or additionally, the first stage can optionally further include a flexure element coupled to the MEMS device. The flexure element can be configured to displace the MEMS device in at least one direction. For example, in some implementations, the first stage defines a two-dimensional plane, and the at least one direction is within the two-dimensional plane (e.g., an X-direction or a Y-direction). Alternatively, the flexure element can be configured to displace the MEMS device in at least two directions (e.g., an X-direction and a Y-direction). Optionally, the flexure element can be a flexure bearing such as a double parallelogram flexure element, for example.

Alternatively or additionally, the first stage can optionally further include a plurality of MEMS devices. Additionally, the first stage can optionally include a plurality of flexure elements, where each of the flexure elements is coupled to a respective MEMS device.

Alternatively or additionally, the first stage can optionally define an opening, and the MEMS device can be arranged in the opening.

Alternatively or additionally, the flexure element can be configured to displace the MEMS device with millimeter (mm)-scale range (e.g., 5-10 mm). Alternatively or additionally, the flexure element can be configured to displace the MEMS device with sub-micron ($\mu m$) precision.

Alternatively or additionally, the MEMS device can optionally be an atomic force microscopy (AFM) chip or a scanning probe microscopy (SPM) chip. Alternatively or additionally, the sample (or specimen) can optionally be a semiconductor wafer.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 9 illustrates an example metrology device machined from a 15-mm thick 7075-T6 aluminum plate using a water jet cutting machine.

DETAILED DESCRIPTION

Figure 1:
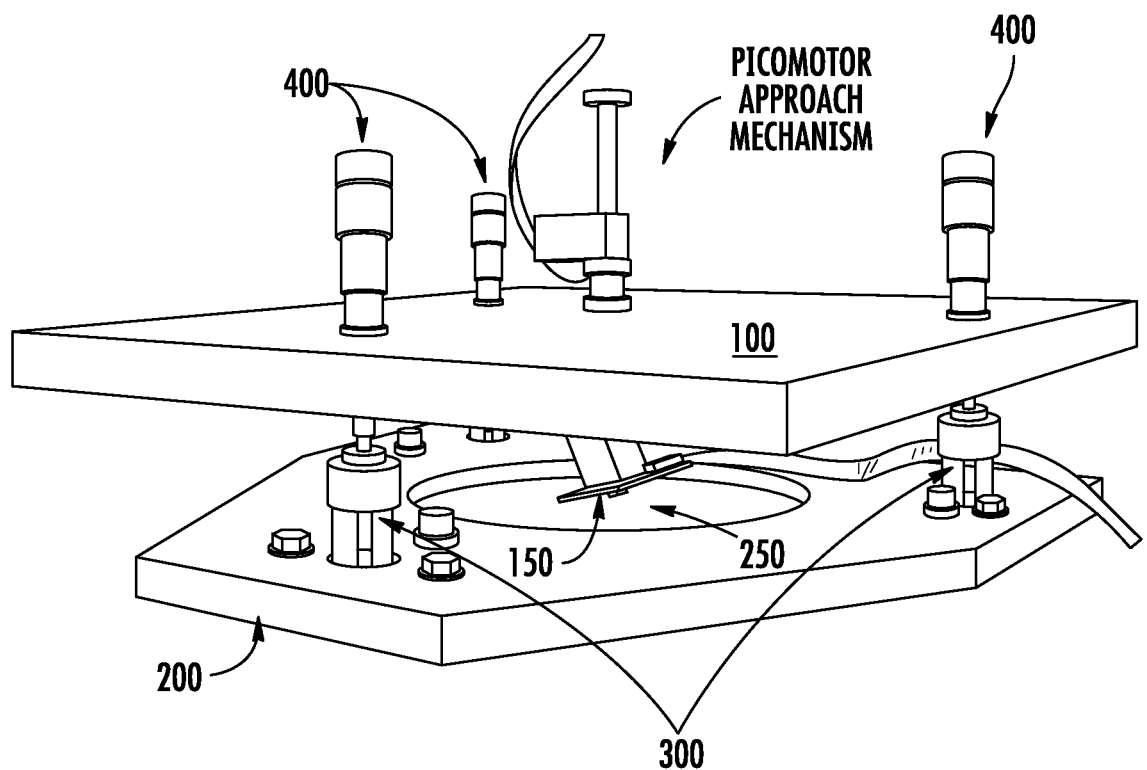
FIG. 1 illustrates an example metrology device according to implementations described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. This disclosure contemplates that the metrology devices and methods described herein can be used with nanoscale and/or microscale metrology applications such as atomic force microscopy, scanning tunneling microscopy, and/or nearfield optical scanning microscopy. The metrology devices and methods can be used to reduce setup time for nanoscale and/or microscale metrology applications.

A metrology device described herein includes a probe stage (also referred to herein as a first stage or an XY precision stage) used to hold a probe-based microscope such as an atomic force microscope (AFM), for example, that can be actuated in the X, Y, and/or Z directions and that can be repeatably placed relative to an object (e.g., a sample or specimen such as a semiconductor wafer) being measured. The metrology device can include actuators connected to flexural bearings, which produce decoupled displacements of the probe-based microscope in the X, Y, and/or Z planes. For example, the flexural bearings can have double-parallelogram flexural bearing design, which allows for highly repeatable displacement of the probe-based microscope over a range of millimeters (e.g., 5-10 mm). The probe stage can be removed from a sample stage (e.g., a second stage) for loading/unloading of samples and can then be repeatably placed back to the same location, which reduces the setup time for probe-based metrology operations in the manufacturing environment. The metrology device can include a kinematic coupling for facilitating repeated removal and replacement of the first stage relative to the second stage. The metrology device can be used to rapidly and automatically align a sample surface with the probe stage to enable high throughput metrology.

Another metrology device described herein includes a plurality of flexure elements to independently actuate a plurality of MEMS devices (e.g., atomic force microscope (AFM) chips) in the X, Y, and/or Z directions. In other words, a plurality of XY flexure elements can be integrated into the metrology device, and each of the XY flexure elements can be individually controlled. By independently actuating the MEMS devices on the stages, multiple points can be measured on the same sample (e.g., a semiconductor wafer) simultaneously. Each MEMS device can be controlled and activated independently in the in-plane directions (X and Y-axis) and the out-of-plane (Z-axis) direction. By parallelizing the automatic approach of MEMS devices to their sample locations, the metrology device described herein allows rapid scanning of samples at a number of locations. Accordingly, the metrology device can scan irregular or curved samples because each of the probes is independently actuated in the Z-axis.

Referring now to FIG. 1, an example metrology device is shown. The metrology device can include a first stage 100 (also referred to herein as a probe stage or an XY precision stage) including a microelectromechanical (MEMS) device 150 having a probe, and a second stage 200 (also referred to herein as a sample stage) configured to hold a sample or specimen 250. This disclosure contemplates that the probe of the MEMS device 150 can optionally be a piezoelectric cantilever tip of the MEMS device. Optionally, the MEMS device can be an atomic force microscopy (AFM) chip or a scanning probe microscopy (SPM) chip. It should be understood that the MEMS device is not limited to AFM and SPM chips. As described above, the metrology systems and methods described herein can be used in other metrology applications. Optionally, the sample can be a semiconductor wafer. It should be understood that the sample is not limited to being semiconductor wafer. The metrology device can also include a kinematic coupler 300 for constraining the first stage 100 in a fixed position relative to the second stage 200. As shown in FIG. 1, the probe of the MEMS device 150 is aligned with a portion of the sample 250 when the first stage 100 is constrained in the fixed position relative to the second stage 200.

Figure 2A:
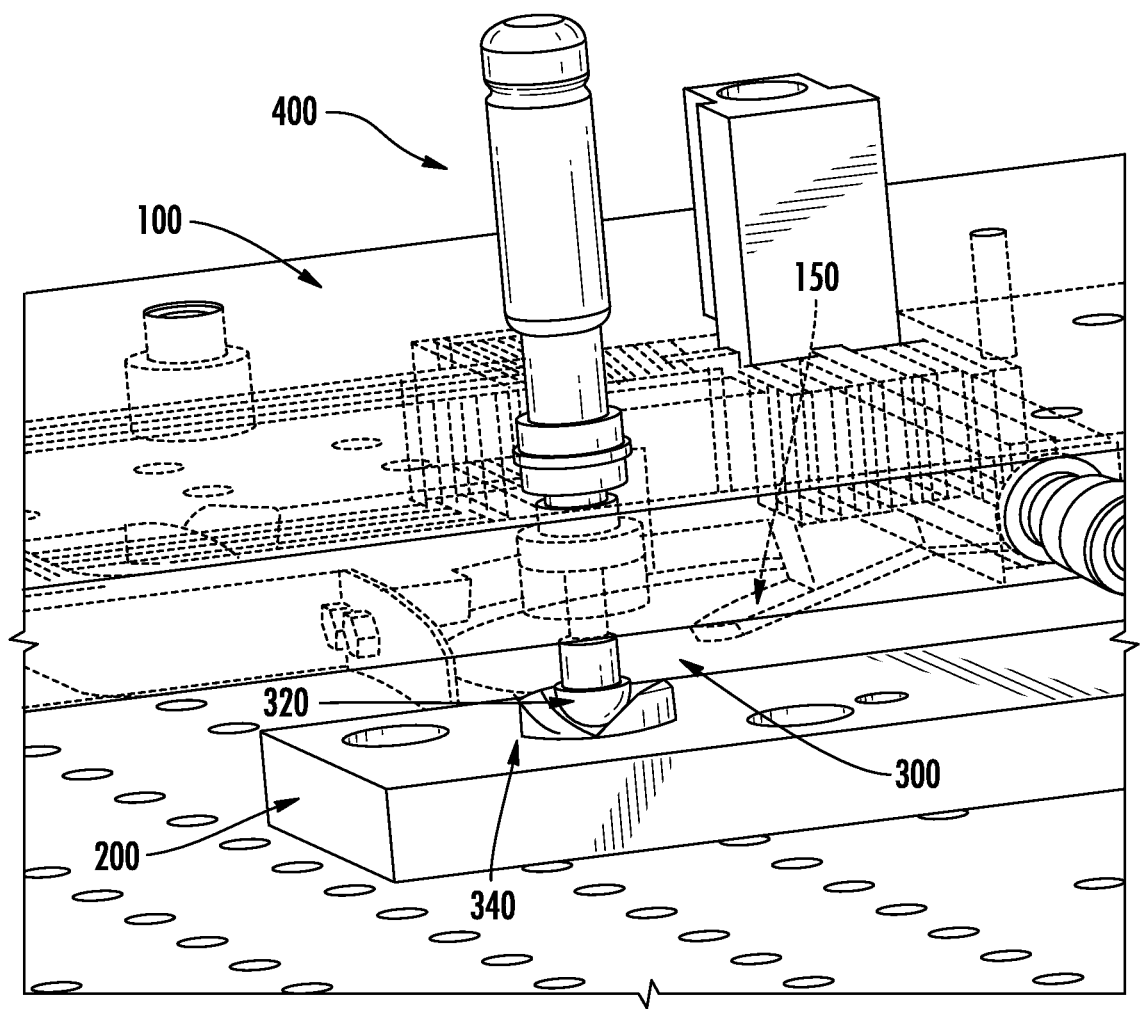
FIG. 2A illustrates an example kinematic coupling of the example metrology device of FIG. 1.

The kinematic coupler 300 can optionally be configured to constrain the first stage 100 in six degrees of freedom. The kinematic coupler 300 can optionally constrain the first stage 100 in the fixed position relative to the second stage 200 using a magnetic force (e.g., using magnets) and/or using the force of gravity. This disclosure contemplates that the kinematic coupler 300 can include at least one fastener and a corresponding groove, where the fastener interfaces with the corresponding groove such that the first stage 100 is constrained in the fixed position relative to the second stage 200. Referring now to FIG. 2A, the kinematic coupler 300 can optionally include a plurality of fasteners 320 coupled to the first stage 100 and a plurality of grooves 340 arranged on the second stage 200. Optionally, the kinematic coupler 300 can include three fasteners and three corresponding grooves. This disclosure contemplates that the kinematic coupler 300 can include more or less than three fasteners and grooves, which are provided only as an example. As shown in FIG. 2A, each of the fasteners 320 can be configured to interface with one of the grooves 340 to constrain the first stage 100 in the fixed position relative to the second stage 200. For example, as shown in FIG. 2A, each of the fasteners 320 can optionally be a ball configured to interface with one of the grooves 340 to constrain the first stage 100 in the fixed position relative to the second stage 200. As shown in FIG. 2A, each of the grooves 340 can optionally be a vee-block. It should be understood that the kinematic coupler 300 is not limited to a fastener and corresponding groove as shown in FIG. 2A.

Referring again to FIG. 1, the metrology device can also optionally include a plurality of micrometers 400. The micrometers 400 can be attached to the first stage 100. Additionally, the micrometers 400 can be configured to adjust the position of the first stage 100 relative to the second stage 200. The micrometers can be used to make fine adjustments to the position of the first stage 100 relative to the second stage 200. For example, one or more micrometers can be used to adjust the position of the first stage 100 relative to the second stage 200 in an out-of-plane direction (e.g., the Z-direction or Z-axis translation). As described below, in some implementations, the first stage 100 defines a two-dimensional plane (e.g., the X-Y plane). Accordingly, displacements or translations in an X-direction and/or a Y-direction are referred to herein as the in-plane directions and displacements or translations in a Z-direction, which are orthogonal to the X- and Y-directions, are referred to as the out-of-plane direction. Alternatively or additionally, one or more micrometers can be used to adjust X-axis or Y-axis rotation. Optionally, after a fixed position is established (e.g., using a first sample), the micrometers 400 can be locked, and the first stage 100 can be repeatedly removed from and returned to the fixed position relative to the second stage 200 using the kinematic coupler 300. Referring now to FIG. 2A, in some implementations, the fasteners 320 can optionally extend from or be attached to the micrometers 400. For example, each of the fasteners 320 can be a spindle of a micrometer 400 press-fitted to a truncated ball.

Figure 3:
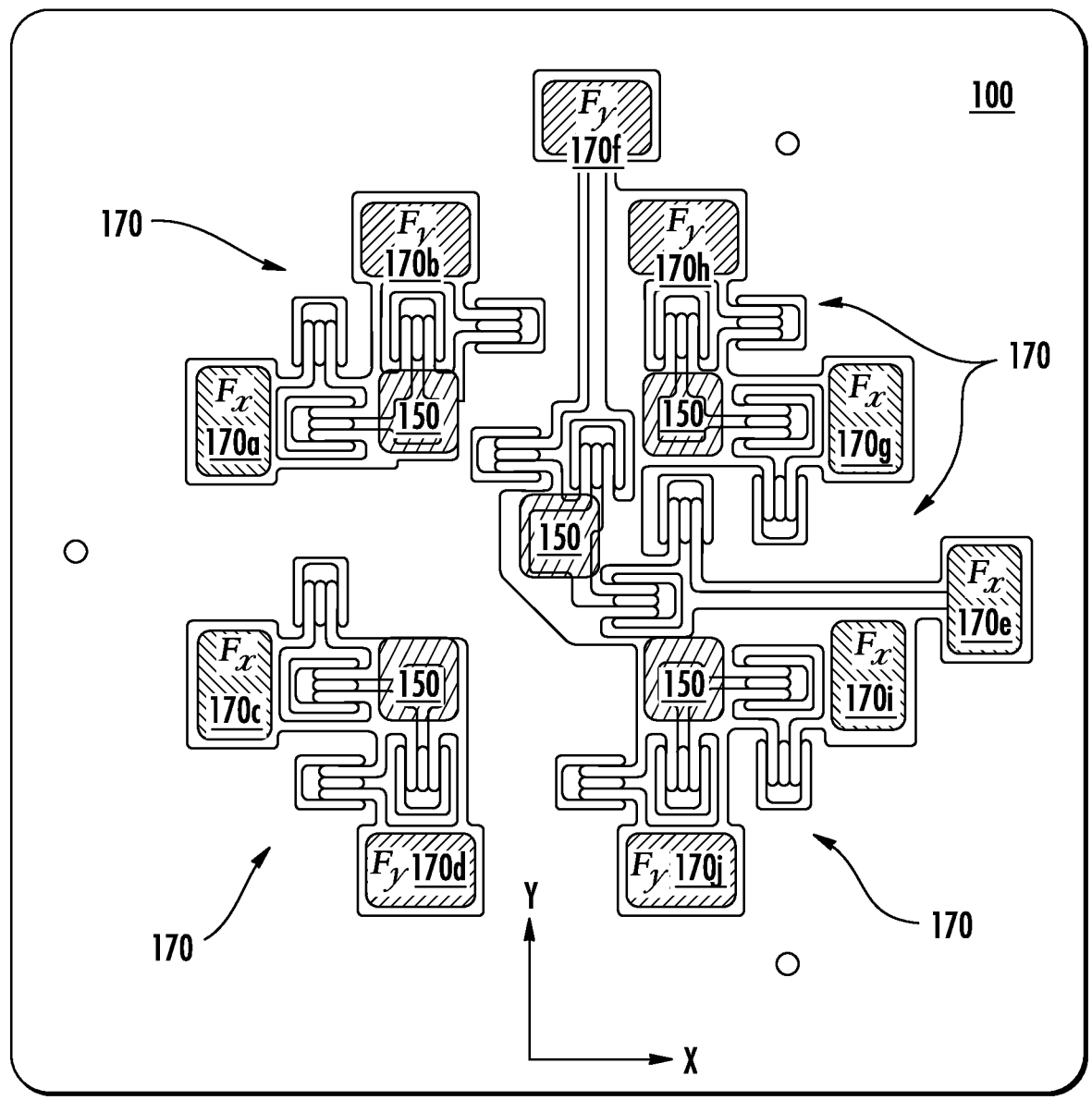
FIG. 3 illustrates an example first stage of a metrology device that includes a plurality of MEMS devices.
Figure 4A:
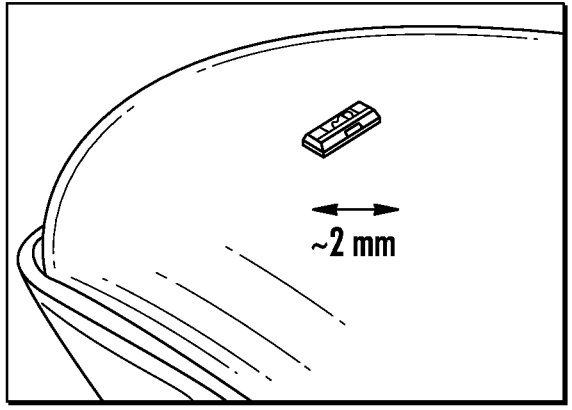
FIG. 4A illustrates an example single chip MEMS device (e.g., a single chip AFM).
Figure 4B:
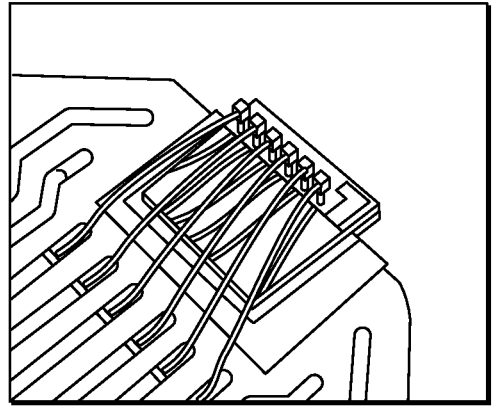
FIG. 4B illustrates an example packaged instrument.
Figure 4C:
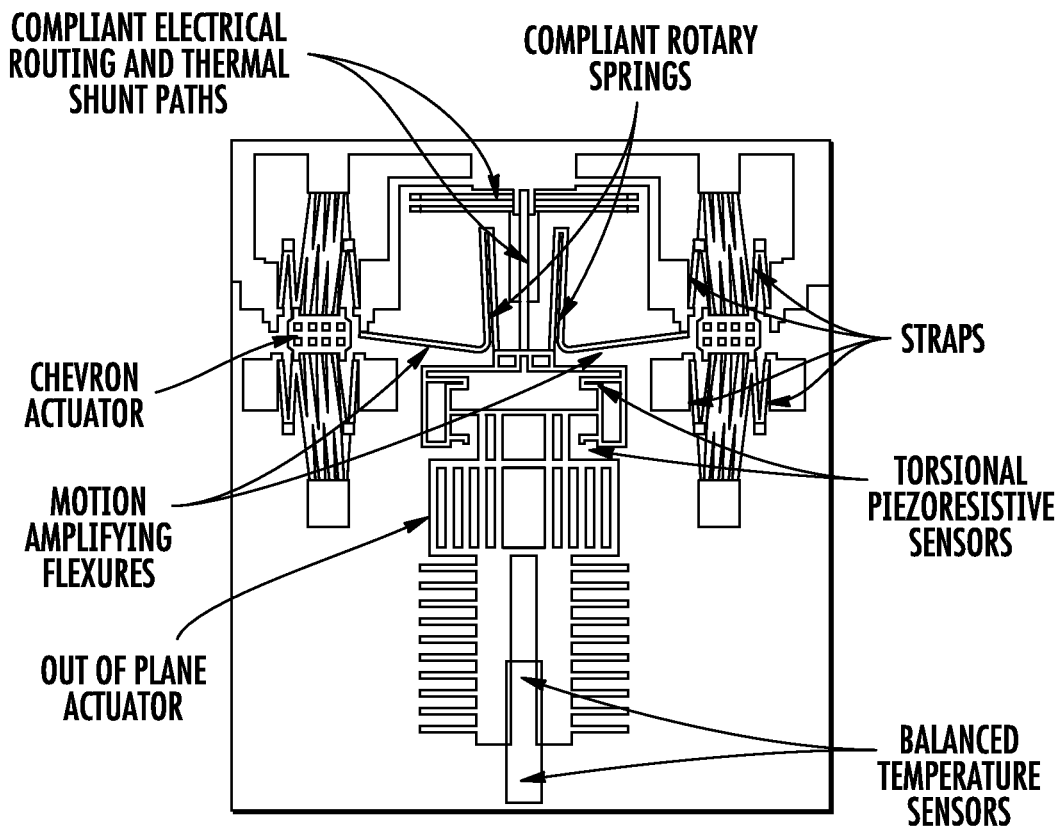
FIG. 4C illustrates an example layout of a MEMS device.

Referring now to FIG. 3, the first stage 100 can optionally include a flexure element 170 coupled to a MEMS device 150. The flexure element 170 can be configured to displace the MEMS device 150 in at least one direction. For example, as shown in FIG. 3, the first stage 100 defines a two-dimensional plane (e.g., the X-Y plane). The flexure element 170 can be configured to displace the MEMS device 150 in the in-plane direction (e.g., the X-direction), e.g., using flexure element 170a. Alternatively or additionally, the flexure element 170 can be configured to displace the MEMS device 150 in the in-plane direction (e.g., the Y-direction), e.g., using flexure element 170b. Alternatively or additionally, the flexure element 170 can be configured to displace the MEMS device 150 in at least two directions (e.g., both the X-direction and the Y-direction), e.g., using flexure elements 170a and 170b. Thus, as used herein, the flexure element 170 can refer to either or both flexure element(s) configured to displace the MEMS device 150 in the X-direction and/or the Y-direction.

Optionally, as shown in FIG. 3, the first stage 100 can include a plurality of MEMS devices 150 and a plurality of flexure elements 170a-170j, where each of the flexure elements 170 is coupled to a respective MEMS device 150. For example, as shown in FIG. 3, the metrology device includes a first flexure element 170a or 170b coupled to a first MEMS device 150 and a second flexure element 170c or 170d coupled to a second MEMS device 150. The first flexure element 170a or 170b and the second flexure element 170c or 170d can be configured to independently displace the first MEMS device and the second MEMS device, respectively. For example, flexure elements 170a and 170c can be configured to displace their respective MEMS devices 150 in the in-plane direction (e.g., the X-direction), and flexure elements 170b and 170d can be configured to displace their respective MEMS devices 150 in the in-plane direction (e.g., the Y-direction).

The metrology device can optionally include a controller operably coupled to the flexure elements 170, where the controller is configured to transmit one or more signals to the flexure elements 170. Alternatively or additionally, the controller can optionally be configured to transmit one or more signals to an actuator (e.g., as shown in FIG. 3), which transmits the signals to the flexure elements 170. This disclosure contemplates that the controller can be implemented using a computing device (e.g., computing device 1800 of FIG. 18). The signals can independently control displacement of each of the MEMS devices 150. For example, the controller can be further configured to transmit a first signal to a first flexure element 170a and/or 170b and to transmit a second signal to a second flexure element 170c and/or 170d. The first flexure element 170a and/or 170b and the second flexure element 170c and/or 170d can simultaneously displace a first MEMS device and a second MEMS device, respectively, in response to the first and second signals. For example, this disclosure contemplates that the signals can be thermal control signals that cause the flexure elements 170 to heat up/cool down, which cause the flexure elements 170 to expand/contract and displace the MEMS devices 150.

Alternatively or additionally, the metrology device can optionally include a controller operably coupled to the MEMS devices 150, where the controller is configured to transmit one or more signals to the MEMS devices 150. Alternatively or additionally, the controller can optionally be configured to transmit one or more signals to an actuator (e.g., as shown in FIG. 3), which transmits the signals to the MEMS device 150. This disclosure contemplates that the controller can be implemented using a computing device (e.g., computing device 1800 of FIG. 18). The one or more signals can independently control a respective scanning pattern of each of the MEMS devices 150. For example, a first respective scanning pattern of a first MEMS device can be different than a second respective scanning pattern of a second MEMS device. This disclosure contemplates that the controller/actuator for operating the flexure elements 170 can depend on feedback from the MEMS devices 150, but the controller/actuator for operating the MEMS devices 150 does not depend on feedback from the flexure elements 170. In this way, when the flexure elements 170 are locked, the MEMS devices 150 can be independently operated or controlled, for example, to execute respective scanning patterns.

As described herein, the first and second MEMS devices can be independently controlled. In other words, respective signals can be transmitted to each of the flexure elements 170 and/or MEMS devices 150, which can independently drive the probes of first and second MEMS devices. For example, the first MEMS device can be driven according to a first scanning pattern. The first scanning pattern can be defined by its characteristics including but not limited to a magnitude and direction of displacement. Additionally, the first scanning pattern can include displacements in one or more of the X-, Y-, and Z-directions. Optionally, the first scanning pattern cause the first MEMS device to scan a first feature of the sample or specimen, where the first feature is defined by a length, width, and/or height. Additionally, the second MEMS device can be driven according to a second scanning pattern. The second scanning pattern can be defined by its characteristics including but not limited to a magnitude and direction of displacement. Additionally, the second scanning pattern can include displacements in one or more of the X-, Y-, and Z-directions. Optionally, the second scanning pattern cause the second MEMS device to scan a second feature of the sample or specimen, where the second feature is defined by a length, width, and/or height. In these examples, the characteristics of the first and second scanning patterns can be different than each other (e.g., each having different directions of displacement). Additionally, the first and second features of the sample can have different features (e.g., each having different heights). In this way, the first and second scanning patterns can be different from one another.

Figure 2B:
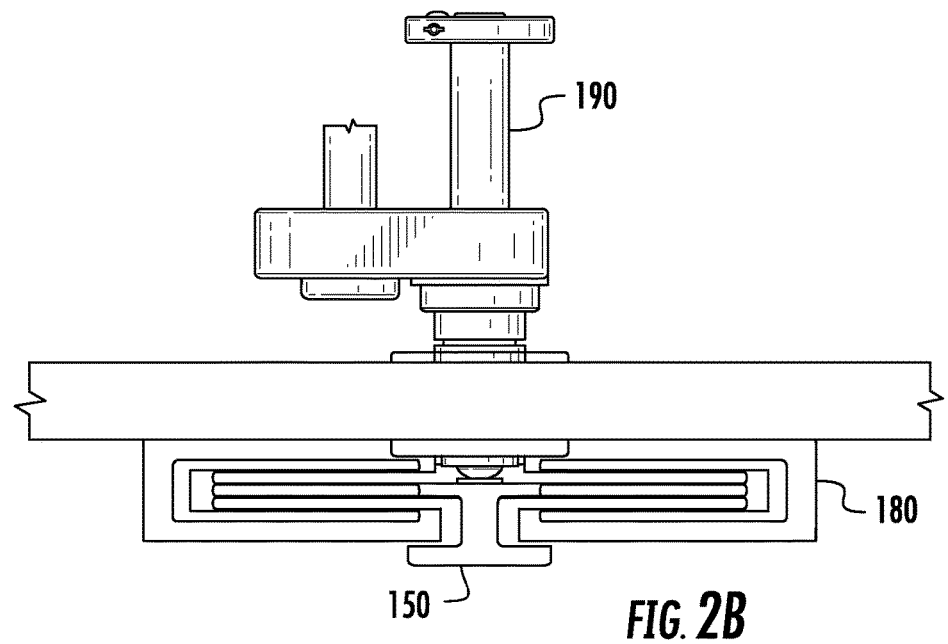
FIG. 2B illustrates an example out-of-plane flexure element.
Figure 2C:
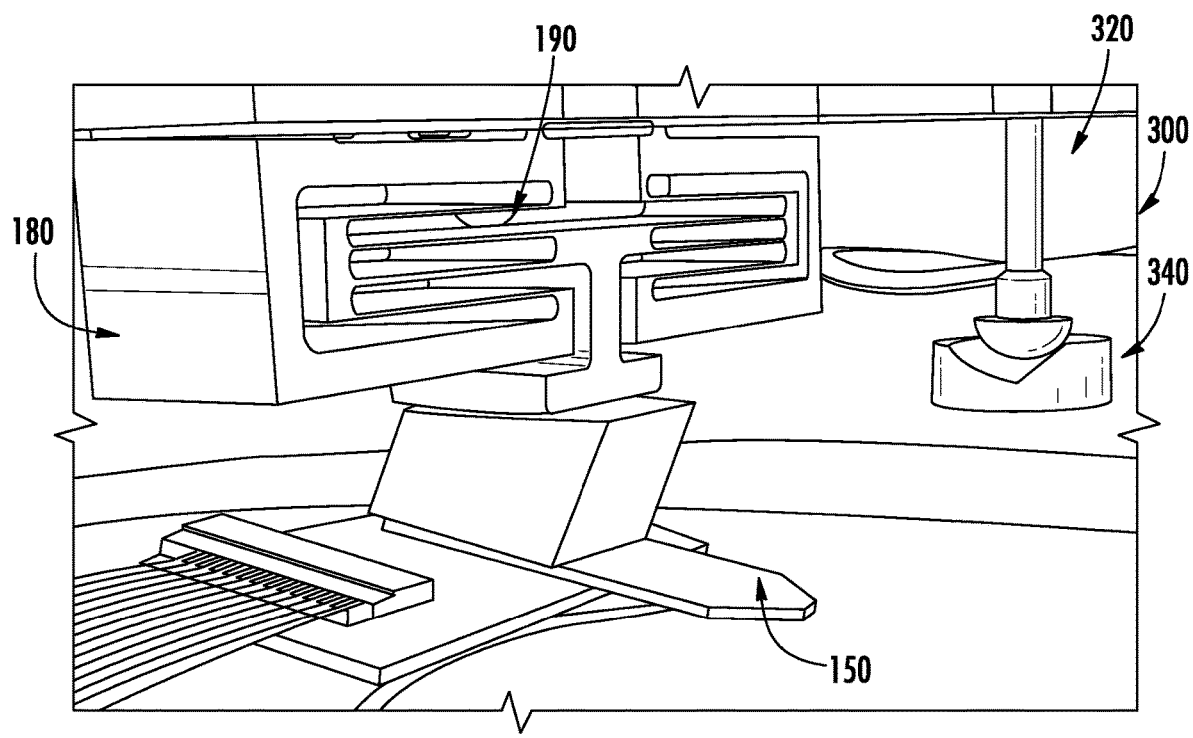
FIG. 2C is another illustration of an out-of-plane flexure element.

In the implementations described herein, each of the flexure elements 170 can be configured to displace the MEMS device 150 with millimeter (mm)-scale range (e.g., 5-10 mm) in the in-plane directions. In addition, each of the flexure elements 170 can be configured to displace the MEMS device 150 with sub-micron (μm) precision in the in-plane directions. Accordingly, the metrology devices described herein allow for mm-scale travel with sub-μm precision in the in-plane directions (e.g., the X-direction and/or the Y-direction). Additionally, as shown in FIGS. 2B and 2C, the MEMS device 150 is located on an out-of-plane flexure element (e.g., a double parallelogram flexure element) that allows the height of the MEMS device 150 to be set or adjusted in the out-of-plane direction (e.g., the Z-direction). The out-of-plane flexure element 180 provides a range of travel of about 1 mm in the out-of-plane axis. It should be understood that the out-of-plane flexure element 180 is separate from the flexure elements that are configured to displace the MEMS device in the in-plane directions (e.g., flexure elements 170). The out-of-plane flexure element 180 can be controlled by one or more control signals provided by a controller and/or actuator, for example, using actuator 190 of FIGS. 2B and 2C. It should be understood that finer Z-axis displacements can be made by controlling the MEMS device 150 itself (e.g., by controlling the probe). As described above, conventional AFM rely on optical systems to determine the location of the probe and as a result are limited to displacements on the order of μm to achieve sub-μm precision.

Examples

In some implementations, the flexure element can optionally be can be a flexure bearing such as a double parallelogram flexure element (or a double parallelogram flexure mechanism (DPFM)), for example. It should be understood that the flexure element is not limited to a DPFM. An XY precision stage including a double parallelogram flexure mechanism (DPFM) is capable of mm-scale displacement in two dimensions. This design provides precise positioning of the MEMS device (e.g., an AFM chip) for wafer inspection.

As long as the geometric dimensions of the flexure element are optimized, it is possible to put multiple stages in a narrow space, which enables simultaneous inspection of a plurality of areas on a wafer for in-line nanomanufacturing applications. For example, in order to provide 3-mm motion length for both X and Y axis, the DPFM requires about 50-mm$^2$ area per AFM chip. It should be understood that this can limit the number of MEMS devices that can be utilized per unit area. This limitation can be overcome by providing flexure elements in the XY precision stage having various shapes and sizes. For example, with reference to FIG. 3, flexure elements 170e, 170f are arranged around flexure elements 170g, 170h, which increases the number of MEMS devices per scanning area.

Flexure bearings are used in the metrology device described herein because of their precision and mechanical simplicity. The flexure bearings are used to position the MEMS device (also referred to as single-chip AFMs) relative to the wafer that is being inspected. The precision positioning stage is designed to be able to achieve mm-scale displacements with micron level precision. In addition, multiple stages with multiple independent AFMs can be incorporated in to the metrology device to increase the inspection speed and area, as shown in FIG. 3. In order to be able to incorporate multiple stages into a single metrology device, the size of the flexure elements can be minimized and the space utilization in the metrology device can be maximized.

Figure 5:
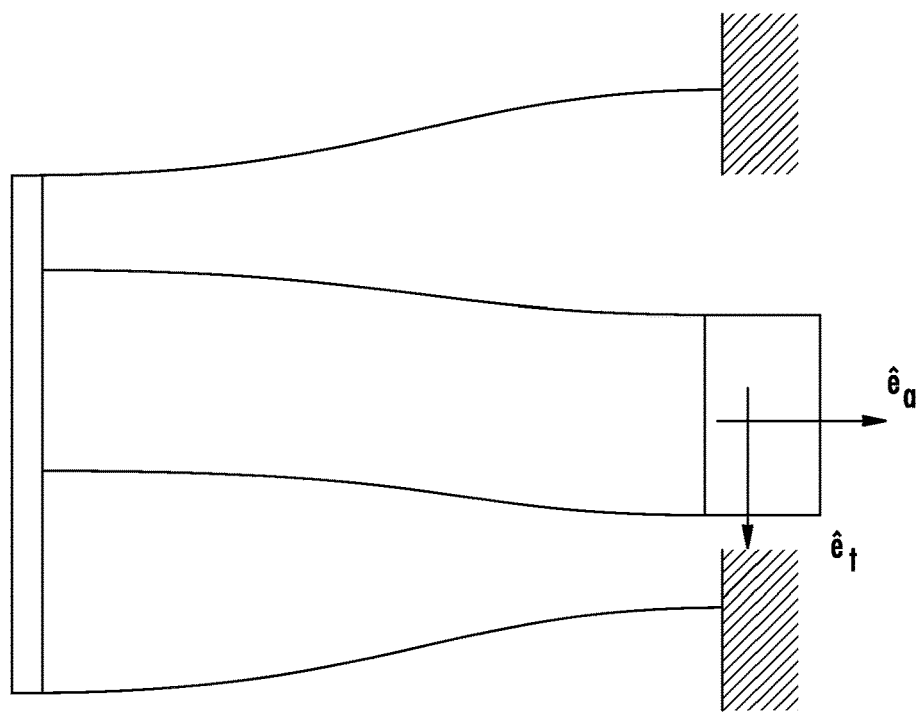
FIG. 5 illustrates a model of a double parallelogram flexure mechanism (DPFM).

Flexure mechanisms are used in micro-positioning XY stages due to their superior isolation of motion between the X and Y axis and their great difference between in-plane and out-of-plane stiffness. DPFMs have been shown to demonstrate extreme precision with mm-scale displacement range. FIG. 5 illustrates a simple model of a DPFM.

Because of the mm-scale deflection of the flexure beams, stiffness in the axial direction is affected by tangential displacement and tangential stiffness is affected by axial force. That is, $$K_a \approx \frac{1}{\left(w^2 + \frac{9}{25}x_t^2\right)} \cdot \frac{12EI}{L}$$

and $$K_t \approx \left[12 - \frac{3}{100}\left(\frac{F_a L^2}{EI}\right)^2\right] \cdot \frac{EI}{L^3}$$

where w, L, and E are the flexure width, beam length, and Young's modulus, respectively and I is the second moment of area of the flexure beam.

Figure 6:
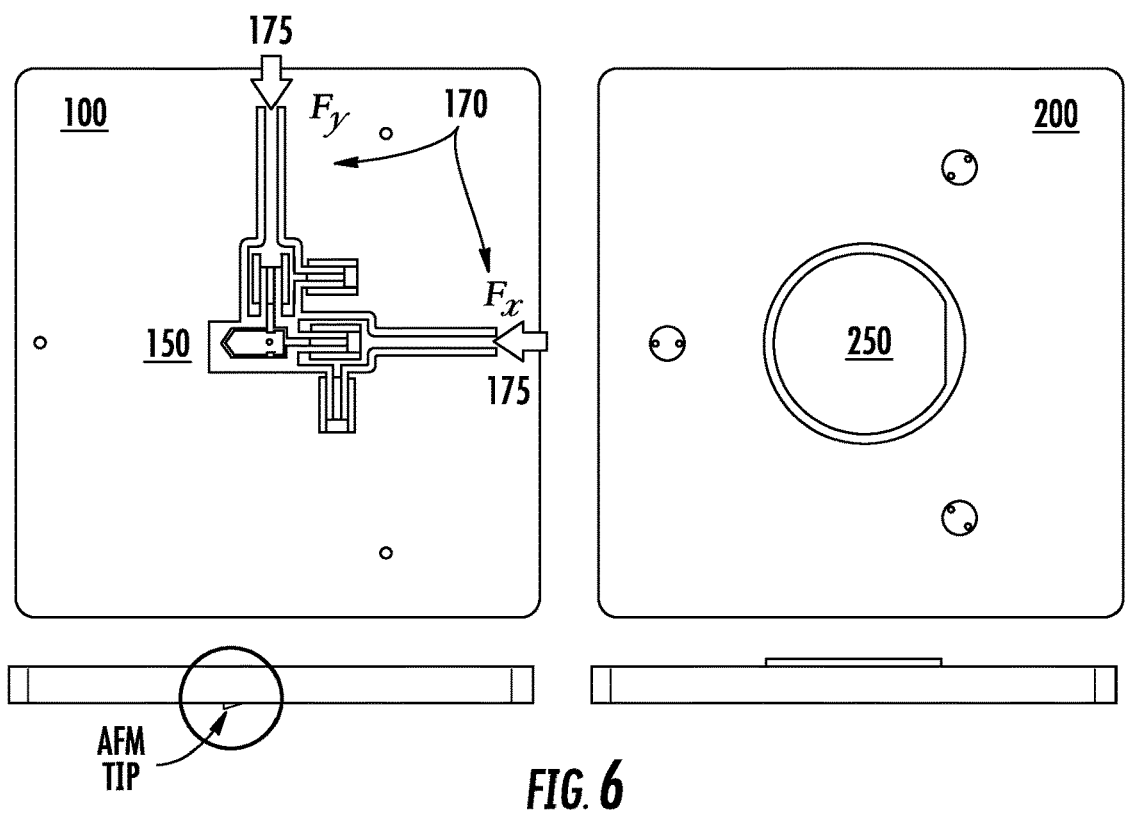
FIG. 6 illustrates an example design for the XY precision stage (e.g., the first stage) using a DPFM as the flexure element. The left side illustrates the top stage with the MEMS device, and the right side illustrates the wafer sample stage (e.g., the second stage).

FIG. 6 illustrates an example design for the XY precision stage (e.g., the first stage 100) using a DPFM as the flexure element 170. The left side is the first stage 100 with the MEMS device 150, and the right side is the wafer sample stage (e.g., the second stage 200 with the sample 250).

Figure 7:
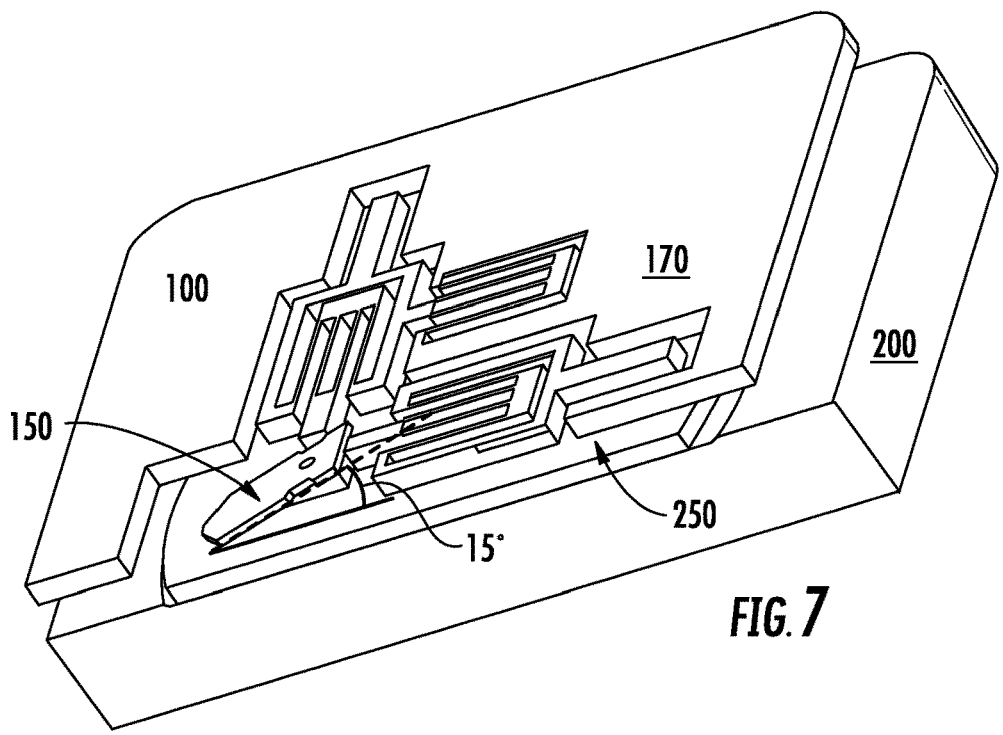
FIG. 7 is a perspective view that illustrates the metrology device with an XY precision stage used position the MEMS device and a sample stage used to hold the sample (e.g., a wafer) for inspection.

FIG. 7 is a perspective view illustrating the metrology device with the first stage 100 (e.g., an XY precision stage) used position the MEMS device 150 and a second stage 200 (e.g., the sample stage) used to hold the sample 250 (e.g., a wafer) for inspection. As described herein, a kinematic coupling can be used to quickly and precisely align the XY precision stage to the sample stage.

Figure 8:
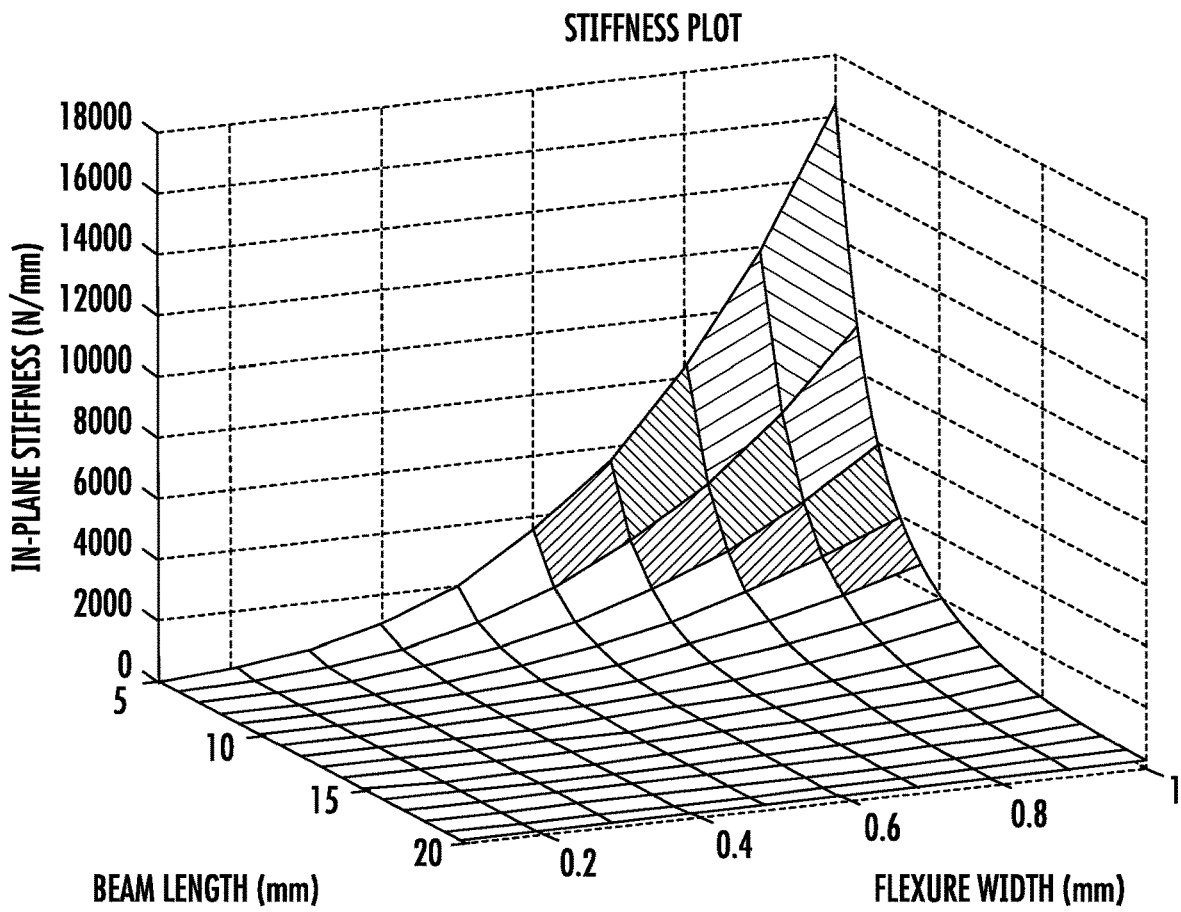
FIG. 8 illustrates mapping of stiffness of an example flexure element varied with beam length (L) and flexure width (w).
Figure 9A:
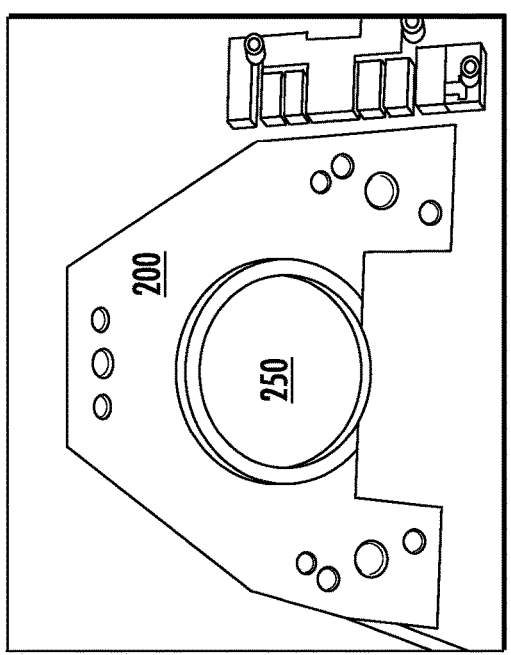
FIG. 9A shows the XY precision stage (e.g., the first stage) with the flexure element.
Figure 9B:
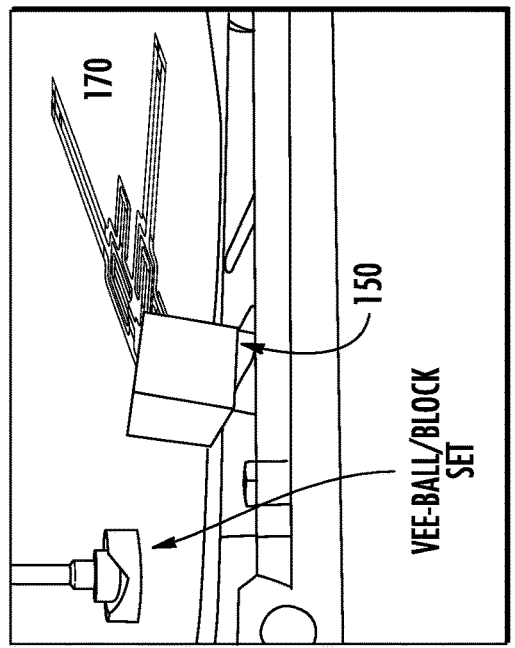
FIG. 9B illustrates the sample stage (e.g., the second stage) with the sample.
Figure 9C:
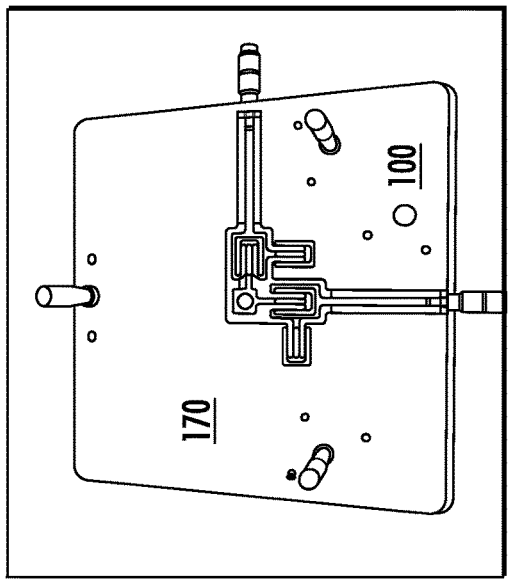
FIG. 9C illustrates the metrology device with first and second stages assembled.
Figure 9D:
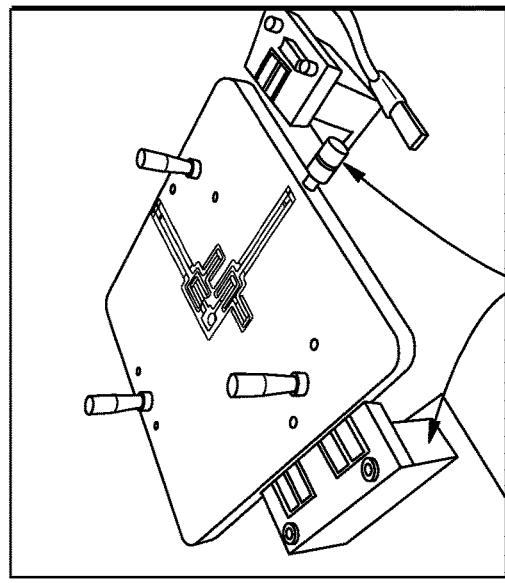
FIG. 9D illustrates the MEMS device and the flexure element under the first stage.

As shown in FIG. 6, the X and Y motions of the flexure elements 170 are driven by a set of micrometer heads (e.g., arrows 175). Each axis of motion can be modeled as a spring system with two parallel sets of springs and two series sets of springs ($K_t$ and $K_a$). Since stiffness in the axial direction is much greater than stiffness in the tangential direction, total stiffness in the X-direction will be two times the stiffness of each of the DPFMs in the tangential direction. Sensitivity analysis for those multiple variables demonstrates that only variations in the beam length (L) and the flexure width (w) have a significant effect on the stiffness. Therefore, the stiffness of the flexure element can be plotted as a function of the beam length and flexure width, as shown in FIG. 8, which illustrates mapping of stiffness varied with beam length (L) and flexure width (w).

FIG. 9 illustrates an example metrology device machined from a 15-mm thick 7075-T6 aluminum plate using a water jet cutting machine. FIG. 9A shows the XY precision stage (e.g., the first stage 100) with the flexure element 170. As shown in FIG. 9A, the MEMS device can be located in an opening formed in the first stage. FIG. 9B illustrates the sample stage (e.g., the second stage) with the sample 250. FIG. 9C illustrates the metrology device with first and second stages assembled. FIG. 9D illustrates the MEMS device 150 and the flexure element 170 under the first stage. In order to provide reasonable stiffness and to minimize size, the flexure element 170 was designed to be cut from a 15 mm-thick block of 7075-T6 aluminum. A length of 20 mm and a width of 0.40 mm was selected for the flexure elements which resulted in a predicted 19.4 N/mm in-plane stiffness. The first mode natural frequency of the stage (e.g., the first stage) was 133 Hz, which is two orders magnitude higher than largest frequencies generated by the laboratory environment. The maximum force input to the mechanism is 50 N per axis, which results in a 2.58 mm displacement of the center stage.

As described above with regard to FIG. 2A, translation in the Z-direction and rotations about the X and Y axes are accomplished via actuation of three micrometers 400 attached to the XY precision stage (e.g., the first stage 100). The spindle of each micrometer can be press-fit to precision truncated balls, shown as FIG. 2A. The balls interface with three vee-blocks, and when the micrometers are locked the ball and vee-block coupling kinematically constrains all 6 DOFs of the XY precision stage relative to the wafer alignment stage.

Measurements

Figure 10:
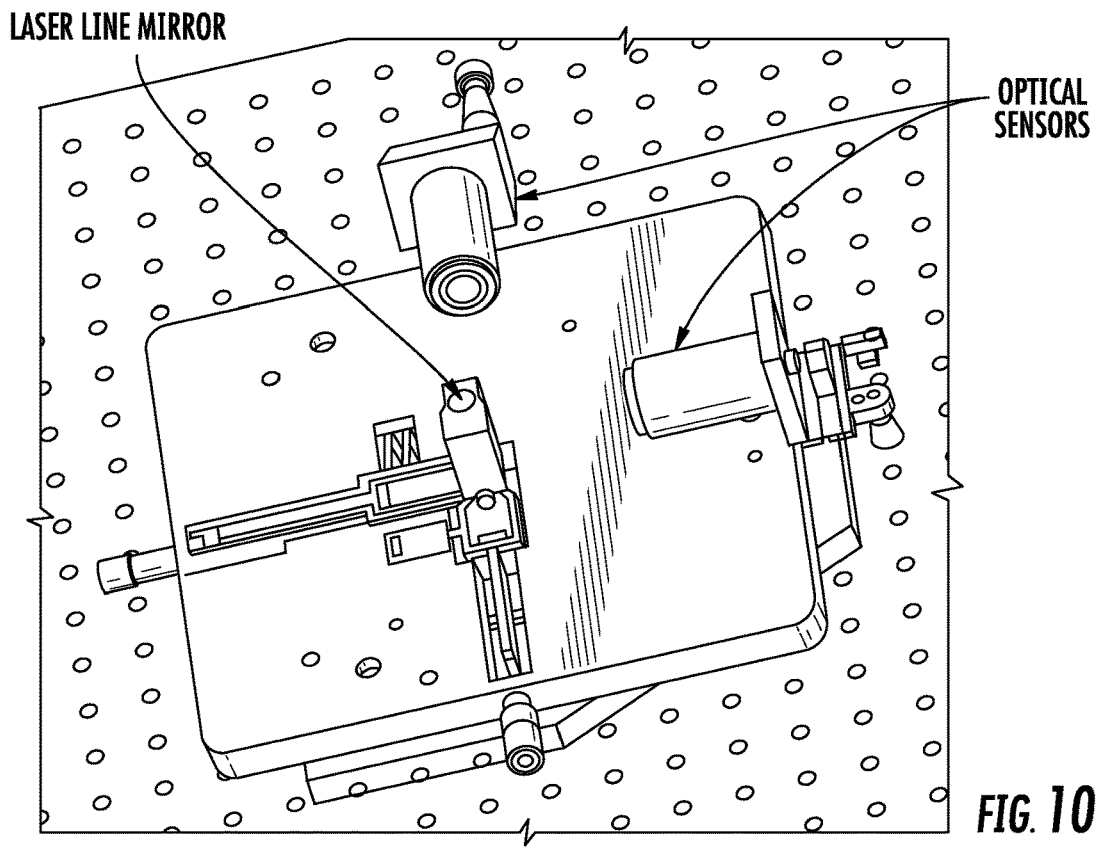
FIG. 10 illustrates setup for the parasitic motion test.

Asymmetric arrangement of the flexure mechanisms and manufacturing error created in-plane yaw error motion. As a result, the motion of the stage differed from the cumulative input from the X and Y actuators. This parasitic motion was measured with two fiber-based optical displacements with 1.0-pm sensitivity and 100-mm working range. The parasitic motion test setup is shown in FIG. 10.

Figure 11:
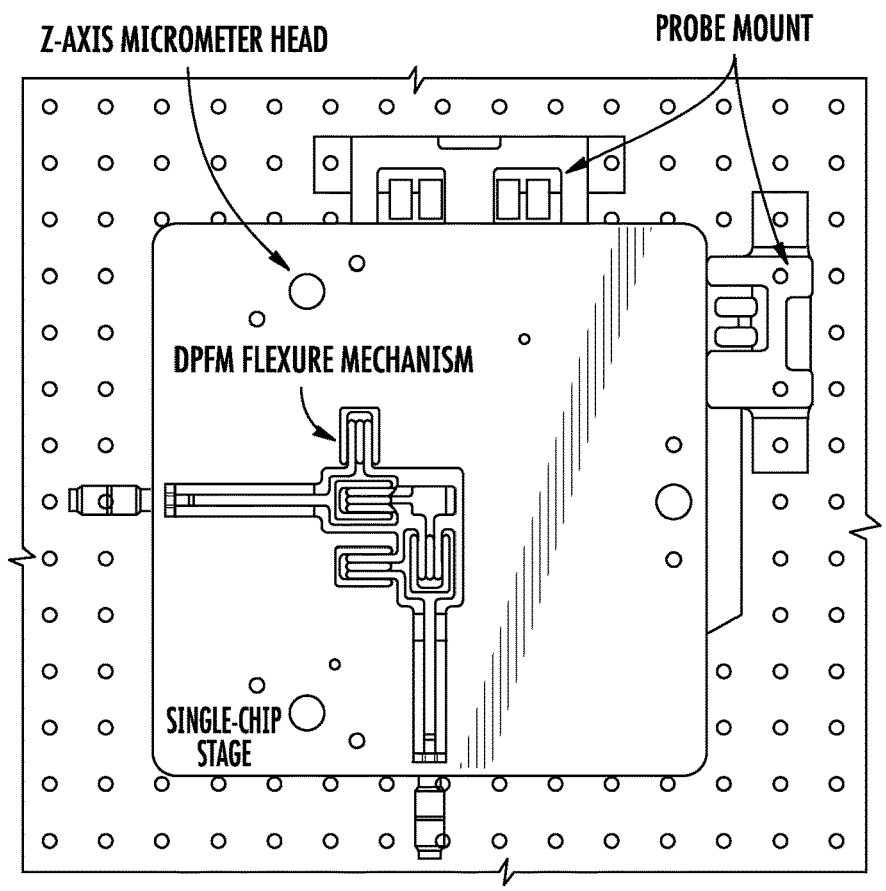
FIG. 11 illustrates the capacitance probe setup.

Repeatability of the kinematic coupling between the XY precision stage (e.g., the first stage) and the sample stage (e.g., the second stage) was tested with capacitance probes. Three capacitance probes from LION Precision with 0.14-nm resolution and 2.0-mm working range were mounted on the optical table as the sensors for X, Y, and Z displacements. The experimental setup is shown in FIG. 11, which illustrates the capacitance probe setup. This setup was used to measure the repeatability in position during the repeated engagement of the kinematic couplings, as the two stages must be separated in order to change samples.

Results

Figures 12, 13:
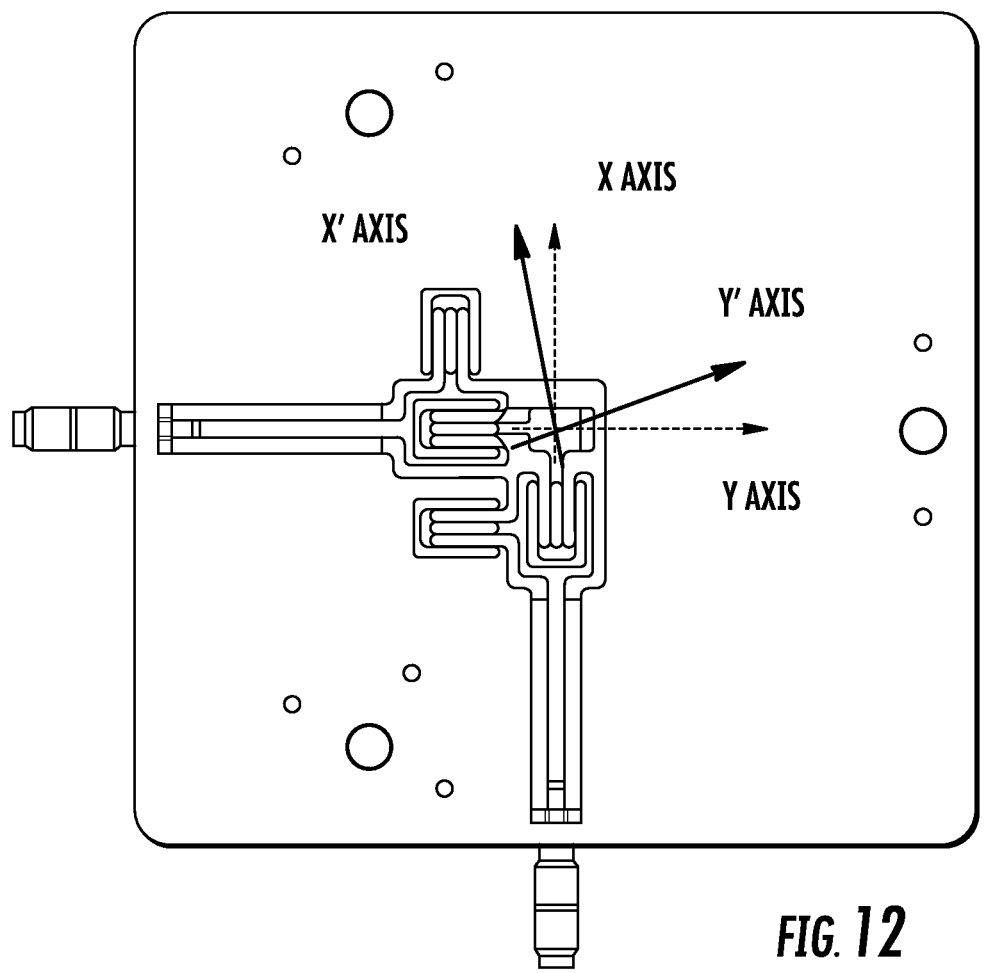
FIG. 12 illustrates is a schematic diagram of the single-chip stage parallelism.
FIG. 13 illustrates repeatability performance in X, Y, Z positions and rotation of X-Y plane for the XY precision stage.

In the flexure motion test, the XY precision stage (e.g., the first stage) exhibited 1.47-μm deviation in the Y-direction over 100-μm of actuation in the X-Direction and 3.80-μm deviation in the X direction over 100-μm of actuation in the Y-direction. The results indicated that the motion of the XY precision stage is not in a set of perfect perpendicular lines, as shown in FIG. 12, which is a schematic diagram of the single-chip stage parallelism. This error was caused by geometric asymmetry and manufacturing errors. However, these errors are repeatable and therefore can be calibrated for in the actuation system (e.g., the controllers and/or actuators described above).

Finite Element Analysis (FEA) was used to calculate the parasitic motion without manufacturing error. The results indicated 7.55-μm X-deviation per 100-μm Y-actuator travel and negative 8.31-μm Y-deviation per 100-μm X-actuator travel. The difference between parallelism test and FEA result suggests that manufacturing tolerances contributed to the parasitic parasitic motion. Water jet cutting the stage yielded uneven flexure thicknesses which affected the the motion of flexure.

Figure 14:
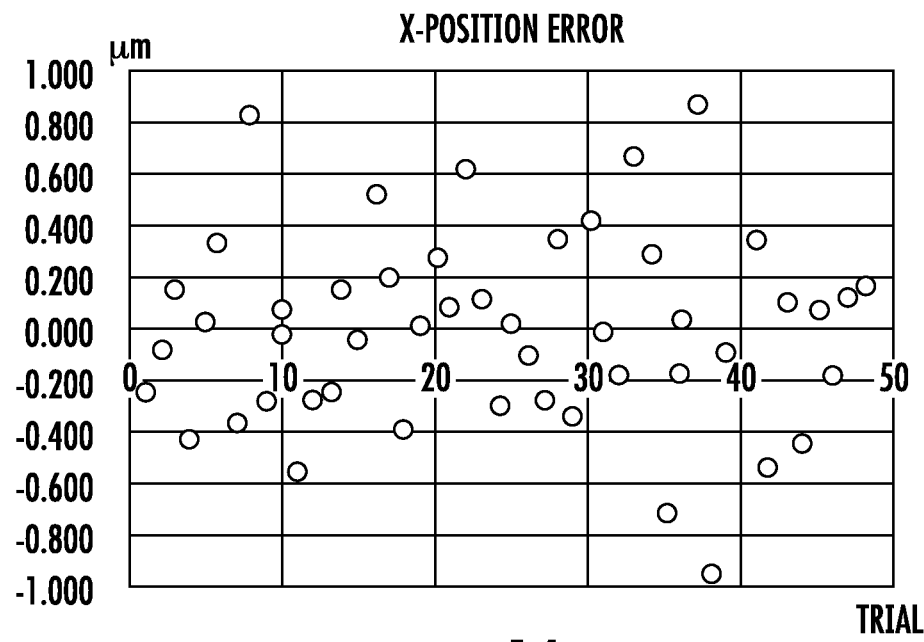
FIG. 14 is a graph that illustrates X-Axis Translational Error.
Figure 15:
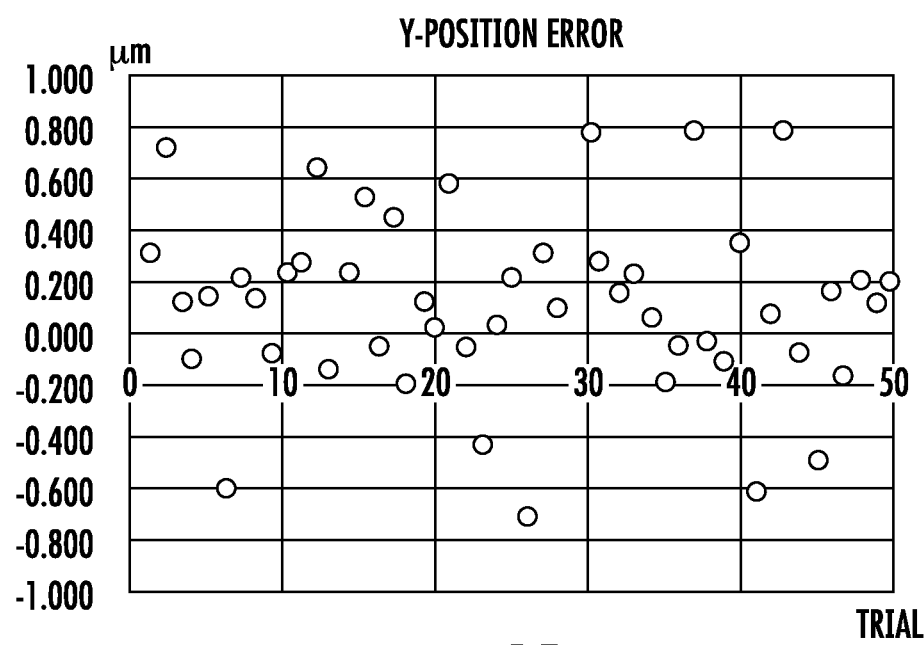
FIG. 15 is a graph that illustrates Y-Axis Translational Error.
Figure 16:
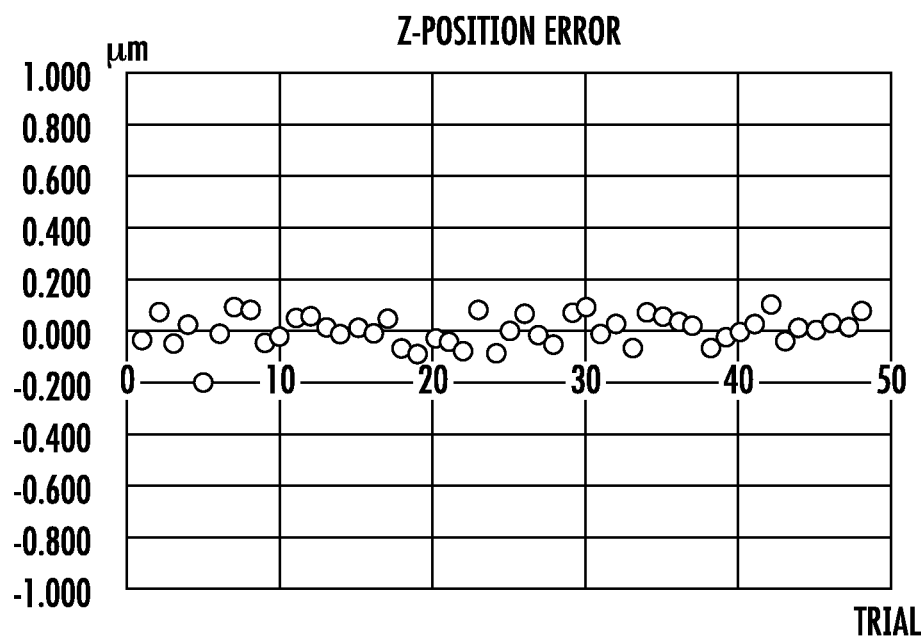
FIG. 16 is a graph that illustrates Z-Axis Translational Error.
Figure 17:
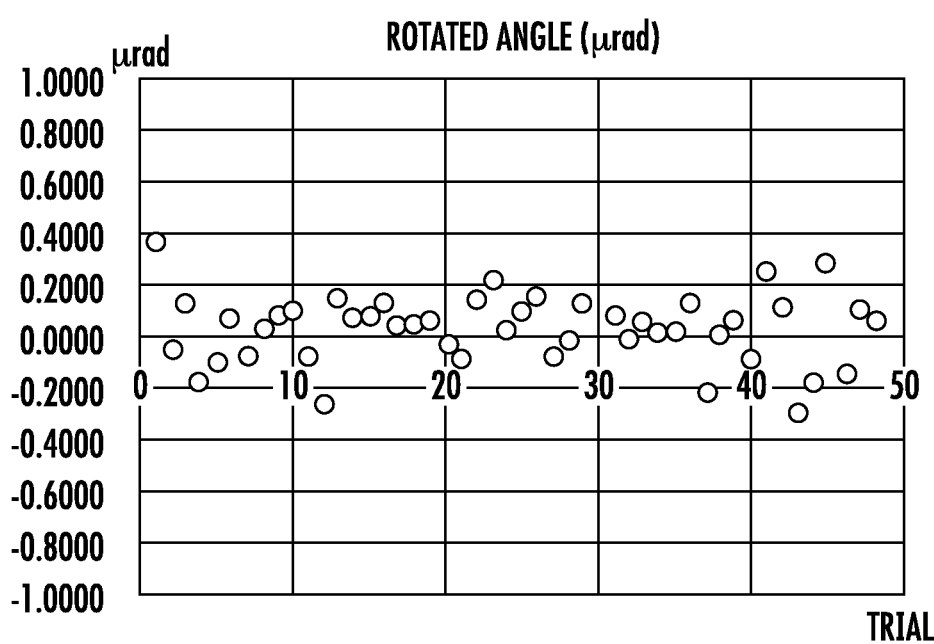
FIG. 17 is a graph that illustrates Rotational Repeatability Error.

FIG. 13 is a table illustrating the repeatability performance in X, Y, Z positions and rotation of X-Y plane for the XY precision stage (e.g., the repeatability for each degree of freedom). Results for the repeatability of the kinematic coupling were recorded for translation in X, Y, and Z positions as well as rotated angle about the Z-axis of the stage. FIGS. 14, 15, and 16 show the error distribution for position error over 50 trials in X, Y, and Z respectively. FIG. 17 shows rotational error about the Z-Axis. Repeatability is defined as the standard deviation calculated from the trials. The XY precision stage has in-plane repeatability of 350 to 400 nm with in-plane rotation of 0.140 μrad and about 60-nm out-of-plane translational repeatability. Generally, AFM equipment scans in a couple of micron meter range, which is greater than the repeatable error. Therefore, an in-plane error of 400 nm is acceptable to be used in single-chip AFM operation.

The XY precision stage of the metrology device described herein is capable of mm-scale displacement with μm-scale precision and enables the in-line inspection of wafers with single-chip AFMs. Parasitic error when actuating the stage was 1.47 and 3.80 μm deviation in X and Y direction respectively per 100-μm of actuator travel in the orthogonal direction. The kinematic coupling exhibited sub-micron in-plane repeatability of 390 nm and 361 nm, as well as 60-nm precision in out-of-plane direction, which are acceptable in operation of AFM scanning.

This flexure mechanism design can be extended to a stage with a plurality of independently actuated AFM chips (e.g., 5 as shown in FIG. 3) to allow for simultaneous measurements at multiple points on a wafer. This disclosure contemplates that closed-loop feedback control can be implemented to approach the sample in the Z-direction. Optionally, using closed-loop feedback control, the micrometers (e.g., micrometers 400 of FIGS. 1 and 2) are not needed in some implementations. The XY precision stage described herein, when kinematically coupled to a sample stage, and automatically actuated in the z-direction enables in-line metrology of silicon wafers.

Example Computing Device

It should be appreciated that the logical operations described herein with respect to the various figures may be implemented (1) as a sequence of computer implemented acts or program modules (i.e., software) running on a computing device (e.g., the computing device described in FIG. 18), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 18:
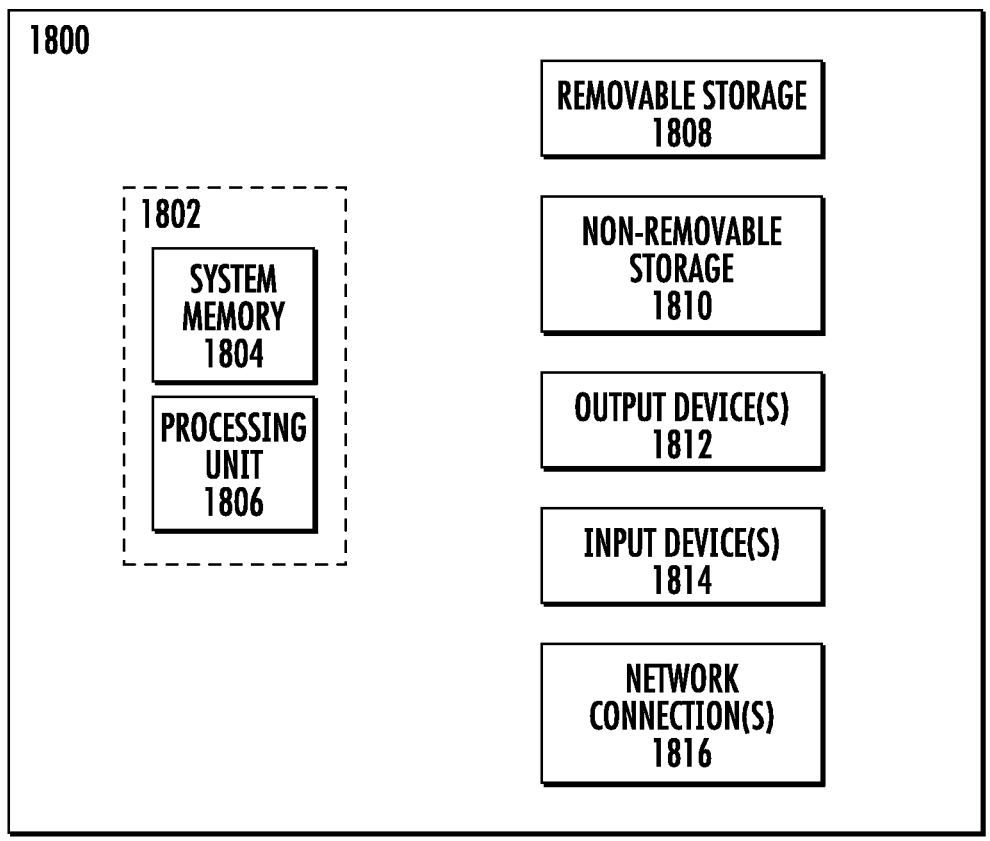
FIG. 18 is a block diagram that illustrates an example computing device.

Referring to FIG. 18, an example computing device 1800 upon which embodiments of the invention may be implemented is illustrated. This disclosure contemplates that the controller(s) for operating the flexure elements and/or MEMS devices can be implemented using computing device 1800. It should be understood that the example computing device 1800 is only one example of a suitable computing environment upon which embodiments of the invention may be implemented. Optionally, the computing device 1800 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 1800 typically includes at least one processing unit 1806 and system memory 1804. Depending on the exact configuration and type of computing device, system memory 1804 may be volatile (such as random access memory (RAM)), non-volatile (such as read-only memory (ROM), flash memory, etc.), or some combination of the two. This most basic configuration is illustrated in FIG. 18 by dashed line 1802. The processing unit 1806 may be a standard programmable processor that performs arithmetic and logic operations necessary for operation of the computing device 1800. The computing device 1800 may also include a bus or other communication mechanism for communicating information among various components of the computing device 1800.

Computing device 1800 may have additional features/functionality. For example, computing device 1800 may include additional storage such as removable storage 1808 and non-removable storage 1810 including, but not limited to, magnetic or optical disks or tapes. Computing device 1800 may also contain network connection(s) 1816 that allow the device to communicate with other devices. Computing device 1800 may also have input device(s) 1814 such as a keyboard, mouse, touch screen, etc. Output device(s) 1812 such as a display, speakers, printer, etc. may also be included. The additional devices may be connected to the bus in order to facilitate communication of data among the components of the computing device 1800. All these devices are well known in the art and need not be discussed at length here.

The processing unit 1806 may be configured to execute program code encoded in tangible, computer-readable media. Tangible, computer-readable media refers to any media that is capable of providing data that causes the computing device 1800 (i.e., a machine) to operate in a particular fashion. Various computer-readable media may be utilized to provide instructions to the processing unit 1806 for execution. Example tangible, computer-readable media may include, but is not limited to, volatile media, non-volatile media, removable media and non-removable media implemented in any method or technology for storage of information such as computer readable instructions, data structures, program modules or other data. System memory 1804, removable storage 1808, and non-removable storage 1810 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 1806 may execute program code stored in the system memory 1804. For example, the bus may carry data to the system memory 1804, from which the processing unit 1806 receives and executes instructions. The data received by the system memory 1804 may optionally be stored on the removable storage 1808 or the non-removable storage 1810 before or after execution by the processing unit 1806.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Advantages

The metrology device described herein has a simple mechanical structure and low mass which facilitate high throughput metrology. Conventional technologies for large-displacement stages utilize two independent mechanisms to translate, i.e., a probe stage that actuates only in the Z-direction and a sample stage that moves in the relative X and Y directions. The optics, actuators, bearings, and sensors in conventional technologies are contained in the sample stage. This results in an excessive mass compared to the metrology device described herein, which leads to inferior mechanical performance.

The metrology device described herein incorporates a feedback mechanism to automatically approach the sample in the Z-direction. The MEMS device (e.g., the AFM) on the XY precision stage is used to determine distance from the sample. Thus, only the stage containing the AFM moves during the approach. This feature reduces setup time for the AFM instrument and enables rapid measurement (e.g., less than 1 minute). Conventional technologies rely on auxiliary sensors and manual approach. Furthermore, conventional technologies require the movement of comparatively massive stages which cannot not be positioned as quickly as the metrology device described herein.

The metrology device described herein supports in-line measurement and inspection of semiconductor wafers. In-line wafer metrology requires precision on the order of nanometers and setup time on the order of minutes. Microscope stages based on conventional technology are incredibly precise, but are slow to operate. The double-parallelogram flexure mechanism and automatic Z-approach of the metrology device described herein allow for nanometer resolution measurement at comparatively high speeds. In order to align the probe with the sample, the metrology device described herein uses kinematic couplings to mount the XY precision stage on the sample stage. Three pairs of vee-blocks and balls constrain all six degree of freedom, making it static enough when scanning operated, providing high resolution as well. Furthermore, the compact and simple design of the metrology device described herein requires fewer parts to be driven, and increases reliability significantly.

The metrology device described herein is simpler than existing technologies, and just as accurate. The combination of kinematic couplings and highly repeatable flexural bearings allows the metrology device described herein to provide highly repeatable positioning without the need for bulky and slow-moving optical alignment techniques. The simplicity of the design of the metrology device described herein allows it to be easily integrated into current nanofabrication systems in order to perform inline inspection. The flexural bearings allow for a larger travel range than conventional systems are capable of. Additionally, the metrology device described herein is significantly faster than conventional technologies. Loading the specimen into the metrology device described herein and approaching the specimen so that features of interest are within the measuring range of the microscope takes less than one minute. The same process can take up to thirty minutes using conventional technologies.

The metrology device described herein uses an AFM to measure distance from the AFM to the sample as a function of the AFM's bridge voltage. Because the AFM instrument and specimen-setup system are separate but not electrically isolated from each other, when the metrology device described herein is running auto-approach (which turns on the piezo actuator responsible for Z-direction motion), there is significant noise in the AFM bridge signal. This noise is of a greater magnitude than that of changes in the bridge signal. The problem is overcome with the application of a notch filter. An active filter rejects frequencies sufficiently far from the resonant frequency of the AFM tip and a clean signal remains.

Another advantage of the metrology device described herein is its combined positioning speed and precision. The metrology device described herein allows inline metrology of semiconductor wafers, and can be applied to other semiconductor manufacturing processes, such as R2R (roll-to-roll) imprint lithography. The chip-based AFM is capable of high speed scanning, which combined with metrology device described herein makes inline metrology a reality for a variety of semiconductor manufacturing processes.

The metrology device described herein allows for the positioning of a plurality of AFM chips whereas conventional technologies are limited to one AFM device at a time. The metrology device described herein allows for independent positioning of a plurality of chips, whereas conventional technologies can position one AFM chip or a number of chips that are attached to each other (e.g., an array of chips). In conventional technologies, when an array of chips is displaced, the displacement (i.e., magnitude and/or direction) of all chips is the same.

The metrology device described herein does not rely on the optical positioning systems that conventional technologies use to align AFM with the sample.

The metrology device described herein is relatively compact compared to conventional technologies. It is lower in mass than conventional technologies a lighter weight, making it easier to realize high throughput metrology. Additionally, the compact design allows for a plurality of AFM chips to scan in a small space and over large areas.

Conventional AFM or SPM instruments can only check topography within a small area (e.g., 10's of micron scale) because the motion of tip takes time and extremely high resolution means extreme numbers of pixels for long-term scanning length. Measuring features over a large area using conventional technology requires multiple scans and positioning of the AFM between scans. This process is time-consuming and has thus far prevented AFM and SPM metrology from being integrated into in-line manufacturing processes. Even though some instruments utilize arrays of AFM tips for scanning, the AFM or SPM instruments are fixed relative to each other and as a result setup requires extreme parallelism between the array of cantilevers and the surface to be sampled. Furthermore, it is impossible to scan surfaces that are not flat with fixed arrays of cantilever tips in conventional AFM and SPM technologies. The metrology device described herein uses multiple moving stage/actuators, each for one sensing tip, to operate multiple AFM tip at different location of specimen simultaneously. Compared with conventional technologies, the metrology device described herein significantly reduces the setup time as well as the tolerances for initial misalignment between the sample and the XY precision stage. The metrology device described herein makes in-line inspection with AFM and SPM chips a viable solution for semiconductor and nano-manufacturing metrology.

The metrology device described herein has the following advantages as compared to conventional technologies:

the ability to separately control motions in X, Y, and Z direction of each MEMS device (e.g., scanning tip or sensing probe);

better performance when scanning a curved specimen;

potential of in-line inspection system;

higher tolerance for misalignment between sample and stage; and/or more compact and capable of relatively high speed positioning.

Another advantage of the metrology device described herein is positioning speed and the ability to independently position multiple scanning probes relative to a sample. This allows for high speed and high area scanning of specimens compared to conventional technologies. The metrology device described herein can be integrated into the product-line of semiconductor manufacturing processes such as R2R (roll-to-roll) lithography systems as well as photolithography processes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A metrology device, comprising:
   a first stage comprising a microelectromechanical (MEMS) device having a probe;
   a second stage configured to hold a sample; and
   a kinematic coupler for constraining the first stage in six degrees of freedom and in a fixed position relative to the second stage, wherein the probe of the MEMS device is precisely aligned with a feature of interest of the sample when the first stage is constrained in the fixed position relative to the second stage, and wherein the first stage is arranged on the second stage.

2. The metrology device of claim 1, wherein the kinematic coupler comprises a plurality of fasteners coupled to the first stage and a plurality of grooves arranged on the second stage.

3. The metrology device of claim 2, wherein each of the fasteners is configured to interface with one of the grooves to constrain the first stage in the fixed position relative to the second stage.

4. The metrology device of claim 2, wherein each of the fasteners comprises a ball configured to interface with one of the grooves to constrain the first stage in the fixed position relative to the second stage.

5. The metrology device of claim 2, wherein each of the grooves is a vee-block.

6. The metrology device of claim 1, further comprising a micrometer.

7. The metrology device of claim 6, wherein the micrometer is further configured to adjust the fixed position of the first stage relative to the second stage.

8. The metrology device of claim 1, wherein the first stage further comprises a flexure element coupled to the MEMS device, and wherein the flexure element is configured to displace the MEMS device in at least one direction.

9. The metrology device of claim 8, wherein the flexure element is a flexure bearing.

10. The metrology device of claim 8, wherein the first stage defines an opening, and wherein the MEMS device is arranged in the opening.

11. The metrology device of claim 8, wherein the flexure element is configured to displace the MEMS device with millimeter (mm)-scale range.

12. The metrology device of claim 8, wherein the flexure element is configured to displace the MEMS device with sub-micron (μm) precision.

13. The metrology device of claim 8, wherein the flexure element is configured to displace the MEMS device in at least two directions.

14. The metrology device of claim 13, wherein the flexure element is a double parallelogram flexure element.

15. The metrology device of claim 8, wherein the first stage defines a two-dimensional plane, and wherein the at least one direction is within the two-dimensional plane.

16. The metrology device of claim 1, wherein the first stage comprises a plurality of MEMS devices.

17. The metrology device of claim 16, wherein the first stage comprises a plurality of flexure elements, and wherein each of the flexure elements is coupled to a respective MEMS device.

18. The metrology device of claim 1, wherein the MEMS device is an atomic force microscopy (AFM) chip or a scanning probe microscopy (SPM) chip.

19. The metrology device of claim 1, wherein the sample is a semiconductor wafer.

20. The metrology device of claim 1, wherein the kinematic coupler comprises a first portion attached to the first stage and a second portion attached to the second stage.

21. The metrology device of claim 1, wherein the kinematic coupler is configured to repeatably constrain the first stage in the fixed position relative to the second stage.

* * * * *